(12) United States Patent
Tagawa

(10) Patent No.: US 8,983,074 B2
(45) Date of Patent: Mar. 17, 2015

(54) INPUT CONTENT DATA MANAGING SYSTEM AND METHOD OF MANAGING INPUT CONTENT DATA

(75) Inventor: Kozo Tagawa, Yokahama (JP)

(73) Assignee: Quad, Inc., Yokahama (JP)

( * ) Notice: Subject to any disclaimer, the term of this patent is extended or adjusted under 35 U.S.C. 154(b) by 0 days.

(21) Appl. No.: 13/533,657

(22) Filed: Jun. 26, 2012

(65) Prior Publication Data

US 2012/0328104 A1 Dec. 27, 2012

Related U.S. Application Data

(63) Continuation-in-part of application No. 13/378,870, filed as application No. PCT/JP2010/068793 on Oct. 19, 2010.

(30) Foreign Application Priority Data

Dec. 22, 2009 (JP) .................................. 2009-291006

(51) Int. Cl.
*H04L 9/00* (2006.01)
*H04L 9/32* (2006.01)
*H04L 9/08* (2006.01)

(52) U.S. Cl.
CPC ............ *H04L 9/3247* (2013.01); *H04L 9/0894* (2013.01); *H04L 2209/463* (2013.01)
USPC ............. 380/277; 380/201; 380/272; 726/15; 713/150; 713/165; 713/168; 713/190; 713/192; 713/193; 705/12

(58) Field of Classification Search
USPC .......... 380/277, 201, 272; 713/150, 165, 168, 713/190, 192, 193; 705/12; 726/15
See application file for complete search history.

(56) References Cited

U.S. PATENT DOCUMENTS 7,206,940 B2 * 4/2007 Evans et al. .................... 713/193
7,957,535 B2 * 6/2011 Ochi et al. ..................... 380/277

(Continued)

FOREIGN PATENT DOCUMENTS

JP 11-296607 10/1999
JP 2003-067532 3/2003

(Continued)

OTHER PUBLICATIONS

International Search Report for International Application PCT/JP2010/068793.

(Continued)

*Primary Examiner* — Beemnet Dada
*Assistant Examiner* — Sayed Beheshti Shirazi
(74) *Attorney, Agent, or Firm* — Dov Rosenfeld; Inventek

(57) ABSTRACT

An input content data managing system, includes a first electronic storing apparatus that stores encoded content data generated by encoding content data with a cryptographic key; a electronic second storing apparatus that stores the cryptographic key with corresponding digest-value data of the encoded content data capable of identifying sameness of the encoded content data; a matching unit that determines a matched cryptographic key stored in the second storing apparatus for the encoded content data stored in the first storing apparatus, the matching using, as a matching key, at a predetermined time, digest-value data of the encoded content data obtained from the encoded content data stored in the first storing apparatus to match with the digest-value data of the encoded content data stored in the second storing apparatus, in order to obtain the content data by decoding the encoded content data using the matched cryptographic key.

10 Claims, 9 Drawing Sheets

(56) References Cited

U.S. PATENT DOCUMENTS

| | | | |
|---|---|---|---|
| 2002/0133396 A1* | 9/2002 | Barnhart | 705/12 |
| 2002/0138341 A1* | 9/2002 | Rodriguez et al. | 705/12 |
| 2003/0118188 A1* | 6/2003 | Collier et al. | 380/277 |
| 2006/0000904 A1* | 1/2006 | Vernay et al. | 235/386 |
| 2007/0185761 A1* | 8/2007 | Mori et al. | 705/12 |
| 2008/0044017 A1* | 2/2008 | Nakano et al. | 380/201 |
| 2008/0155677 A1* | 6/2008 | Hossain et al. | 726/15 |
| 2008/0229115 A1* | 9/2008 | Wollnik et al. | 713/190 |
| 2009/0013195 A1* | 1/2009 | Ochi et al. | 713/193 |
| 2009/0202071 A1* | 8/2009 | Kato | 380/201 |
| 2009/0208018 A1* | 8/2009 | Buckingham et al. | 380/277 |
| 2010/0174919 A1* | 7/2010 | Ito et al. | 713/192 |
| 2011/0173444 A1* | 7/2011 | Sato et al. | 713/165 |
| 2012/0210120 A1* | 8/2012 | Irvine | 713/150 |
| 2013/0145160 A1* | 6/2013 | Bursell | 713/168 |

FOREIGN PATENT DOCUMENTS

| | | |
|---|---|---|
| JP | 2004-013606 | 1/2004 |
| JP | 2005-295353 | 10/2005 |
| JP | 2006-018837 | 1/2006 |
| JP | 2006-128865 | 5/2006 |
| JP | 2009-193544 | 8/2009 |
| WO | WO 2005071878 | 8/2005 |

OTHER PUBLICATIONS

Written Opinion of the Isa for International Application PCT/JP2010/068793.

* cited by examiner

SEQUENCE VIEW (NO. 1) SHOWING EXAMPLE OF OPERATIONS OF EMBODIMENT

INPUT CONTENT DATA MANAGING SYSTEM AND METHOD OF MANAGING INPUT CONTENT DATA

CROSS-REFERENCE TO RELATED APPLICATIONS

This application is a continuation-in-part of and claims the benefit of priority of U.S. patent application Ser. No. 13/378,870, which was filed on Dec. 16, 2011 under 35 U.S.C. 371 as the U.S. National Stage of International Application No. PCT/JP2010/068793, filed Oct. 19, 2010. U.S. patent application Ser. No. 13/378,870 and International Application PCT/JP2010/068793 claim the benefit of priority of Japanese Patent Application No. 2009-291006 filed Dec. 22, 2009, now issued as Japanese Patent JP 4835886. The contents of each of U.S. patent application Ser. No. 13/378,870, International Application PCT/JP2010/068793, and Japanese Patent Application No. 2009-291006 are incorporated herein by reference.

BACKGROUND OF THE INVENTION

1. Field of the Invention

The present invention relates to a technique for constructing and controlling an input content data managing system and method of managing input content data.

2. Description of the Related Art

With the diffusion of personal computers (PCs), Internet, mobile phones and the like, an environment where a large number of people can easily handle data processing terminals has been reached and performing electronic voting or electronic questionnaires may be actualized.

Although there have been various electronic voting systems proposed (see Japanese Laid-open Patent Publication No. 2009-193544, for example), those systems place emphasis on efficiency as data processing systems and many of them have an embodiment where an integrally structured processing system processes operations by accepting vote contents from voters via networks.

Japanese Laid-open Patent Publication No. 2009-193544 is mentioned as possible related art.

SUMMARY OF THE INVENTION

In order to efficiently transition to electronic voting from conventional paper based voting, it is necessary to highlight conventional separated functions such as performed by voter list administration, voting stations, and a ballot-counting station, including maintaining, on a system, the roles corresponding to these functions In such a case, conditions required for an electronic voting system may be as follows.
(1) Nobody can know the results of voting until the votes are counted.
(2) Voters have been previously registered and can vote only once.
(3) Nobody can know who voted for whom.
(4) Voters cannot show evidence regarding whom they voted for.
(5) It is not possible for an attacker to force voters to show evidence regarding whom they voted-for.
(6) Voters can verify that their votes are counted.
(7) It is possible to verify that the final published results correctly count all votes.

Here, condition (1) is a requirement to ensure independence and safety of the ballot-counting. Condition (2) is a requirement to ensure eligibility of the voters. Conditions (3) to (5) are requirements to ensure anonymity of the votes and prevention of voting by forced intervention. Conditions (6) and (7) are of voting results.

Conventionally, an electronic voting system that sufficiently meets such requirements is not known, and there has been a wait for one to be provided.

The present invention is made in light of the above problems, and may provide a highly practical electronic voting system that puts emphasis on the conventional separated functions such as performed by voter list administration, polling stations, and a ballot-counting station, and capable of fulfilling all or part of the above requirements.

According to an embodiment, there is provided an input content data managing system, including a first electronic storing apparatus that stores original encoded content data generated by encoding original content data with a cryptographic key; a second electronic storing apparatus controlled separately from the first storing apparatus, and that stores the cryptographic key with associated digest-value data generated from the original encoded content data and capable of identifying sameness of newly obtained encoded content data to the original encoded content data; a matching unit that determines the cryptographic key stored in the second storing apparatus that corresponds to the encoded content data stored in the first storing apparatus by matching, using as a matching key, at a predetermined time, the digest-value data of the encoded content data determined from the encoded content data stored in the first storing apparatus to match to the digest-value data of the encoded content data stored in the second storing apparatus, in order to obtain the content data by decoding the encoded content data by the matched cryptographic key.

According to another embodiment, there is provided a method of managing input content data, including storing original encoded content data generated by encoding original content data with a cryptographic key in a first electronic storing apparatus; storing the cryptographic key with associated digest-value data of the encoded content data capable of detecting identicalness of the encoded content data in a second electronic storing apparatus, which is controlled separately from the first storing apparatus; determining the cryptographic key stored in the second storing apparatus that corresponds to the encoded content data stored in the first storing apparatus by matching, using, as a matching key at a predetermined time, digest-value data of the encoded content data obtained from the encoded content data stored in the first storing apparatus to match with the digest-value data of the encoded content data stored in the second storing apparatus, in order to obtain the content data by decoding the encoded content data by the matched cryptographic key.

According to the electronic voting system of the present invention, a highly practical electronic voting system can be provided by placing emphasis on the conventional separated functions such as voter list administration, a polling and a ballot-counting station.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
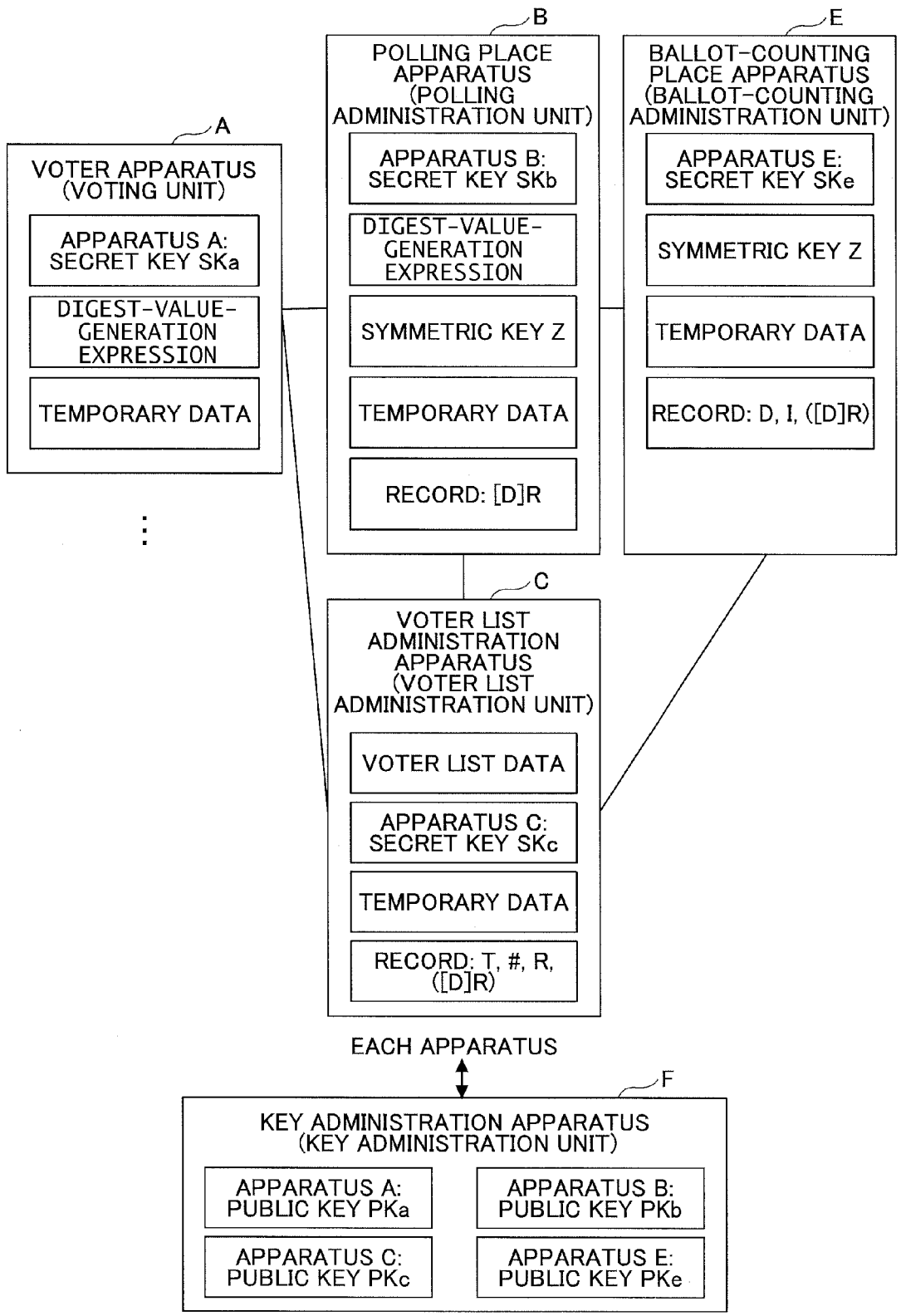
FIG. 1 shows an example of a structure of a system according to an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment

The preferred embodiments will be explained.

Structure

FIG. 1 shows an example of a structure of a system according to an embodiment of the present invention.

As shown in FIG. 1, the system of the embodiment includes a voter apparatus (a voting unit) A, a polling place apparatus (a polling administration unit) B, a voter list administration apparatus (a voter list administration unit) C, a ballot-counting place apparatus (a ballot-counting administration unit) E, and a key administration apparatus (a key administration unit) F, connected with each other through networks.

The voter apparatus A is a data processing terminal apparatus such as a PC, a mobile phone or the like operated by a voter. The voter apparatus A may be owned by the voter, or may be positioned at a polling place or the like by the operator of an election or the like. When the voter apparatus A is owned by a voter, it is desirable to perform user identification such as performing a biometric identification, taking a photograph or the like at the voter apparatus A side so that other people cannot falsely vote.

As for the operations, a secret key SKa of the voter apparatus A, and a predetermined digest-value-generation-expression such as a hash computing operation or the like for generating digest-value data, which will be explained later, are used, and various temporary data, which will be explained later, exist. The secret key SKa is used for communicating in secret and as a signature to specify a voter. Other methods may be used for specifying the voter or having communication be secret.

The polling place apparatus B is a data processing apparatus such as a server apparatus, a PC or the like that accepts votes from the voter apparatus A. As for the operations, a secret key SKb of the polling place apparatus B, a predetermined digest-value-generation-expression such as a hash computing operation or the like for generating digest-value data, and a symmetric key Z are used, and various temporary data, which will be explained later, exist. The secret key SKb and the key Z are used for having communication be secret, and when other methods are used for having the communication in secret, these are not necessary. Further, as for records of the operations, an encoded vote-content data "[D]R", which will be explained later, is recorded. Digest-value data "([D]R)" may be obtained by an encoded vote-content data "[D]R" and the computing expression for generating the digest value. The digest-value-generation-expression may be separately controlled, or controlled as a record stored in the polling place apparatus B.

The voter list administration apparatus C is a data processing apparatus such as a server apparatus, a PC or the like that verified a voter. As for the operations, a secret key SKc of the voter list administration apparatus C in addition to voter list data are used, and various temporary data, which will be explained later, exist. The secret key SKc is used for having communication be secret and when other methods are used for having the communication in secret, this is not necessary. Further, as for records of the operations, a time stamp T, a voting number #, a temporary key R and the digest-value data "([D]R)", which will be explained later, are recorded.

The ballot-counting place apparatus E is a data processing apparatus such as a server apparatus, a PC or the like that performs counting or opening of ballots or votes. As for the operations, a secret key SKe of the ballot-counting place apparatus E and the symmetric key Z are used, and various temporary data, which will be explained later, exist. The secret key SKe and the key Z are used for having communication be secret and when other methods are used for having the communication in secret, these are not necessary. Further, as for records of the operations, finally obtained vote contents D, classification information I, and digest-value data "([D]R)" are recorded.

The key administration apparatus F is a data processing apparatus such as a server apparatus, a PC or the like that retains public keys previously issued for the respective apparatuses in accordance with public key cryptosystems. The key administration apparatus F includes public keys PKa, PKb, PKc and PKe of the apparatuses.

The polling place apparatus B, the voter list administration apparatus C, and the ballot-counting place apparatus E may be provided at geographically remote location or may be provided at the same location. Further, those may be composed of physically different respective apparatuses or may be composed of respective components constructed by software in a single apparatus.

Figure 2:
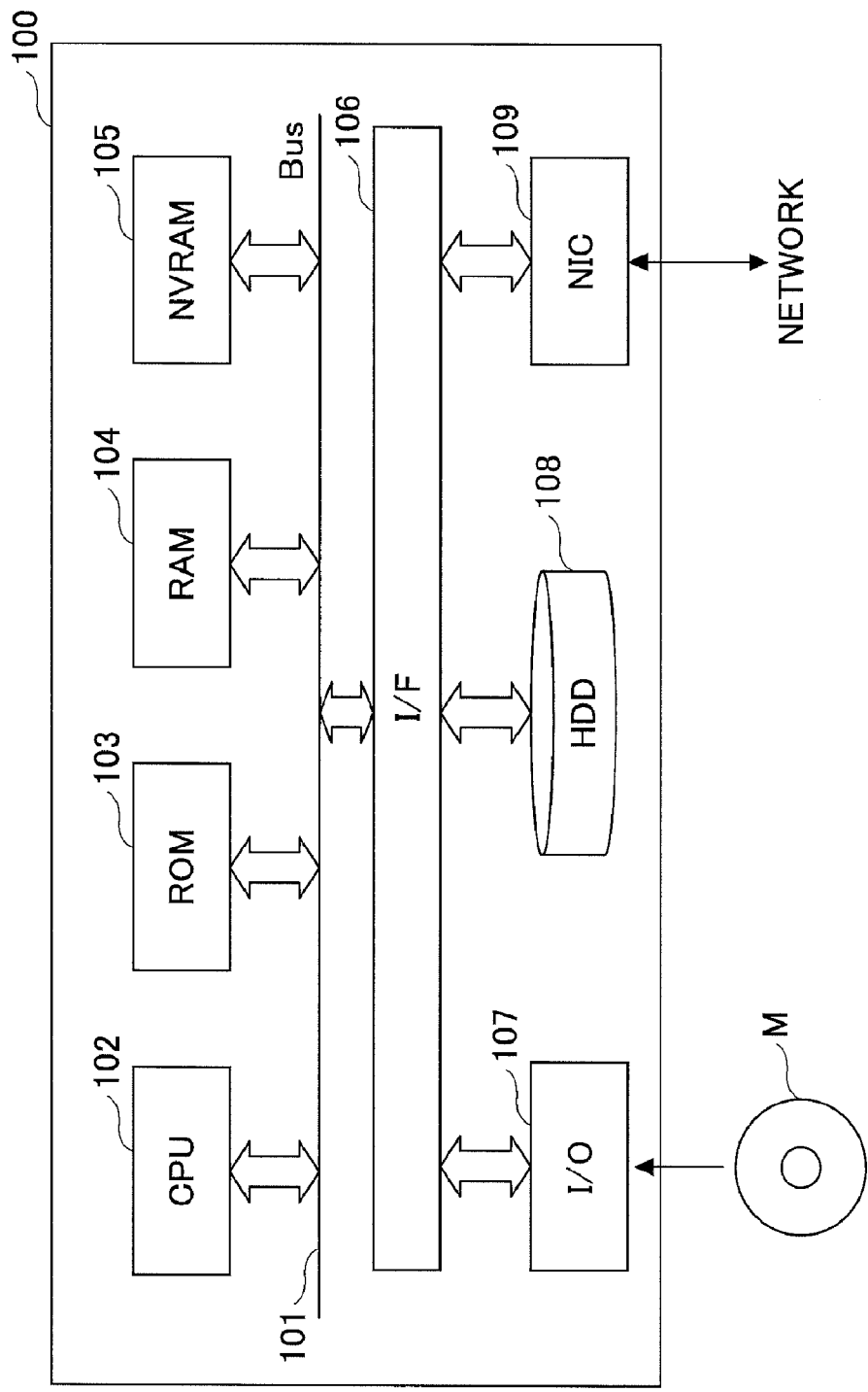
FIG. 2 shows an example of a hardware structure of each of the apparatuses.

FIG. 2 shows an example of a hardware structure for each of the apparatuses.

As shown in FIG. 2, each of the apparatuses 100 includes a CPU 102, a ROM 103, a RAM 104, a NVRAM (Non-Volatile Random Access Memory) 105, and an I/F (Interface) 106 connected to a system bus 101, an I/O (Input/Output Device) 107 such as a keyboard, a mouse, a monitor, a CD/DVD (Compact Disk/Digital Versatile Disk) drive or the like, a HDD (Hard Disk Drive) 108, and a NIC (Network Interface Card) 109 connected to the I/F 106 and the like. "M" means a medium (recording medium) such as a CD/DVD or the like where a program or data is stored.

Operation

The operations of the embodiment will be explained hereinafter. In the following description, "SKx" expresses a secret key of an apparatus X, "PKx" expresses a public key of an apparatus X, "(Y)" expresses a digest value of data Y, and "[Y]K" expresses encoded data of data Y encoded by a cryptographic key K. Here, the digest value means a value obtained by converting original data by a hash computing operation or the like that becomes a different value when the original data is different so that it can be used for detecting identicalness of original data. Further, the digest value means a value that is very difficult to regenerate the original data therefrom.

Figure 3:
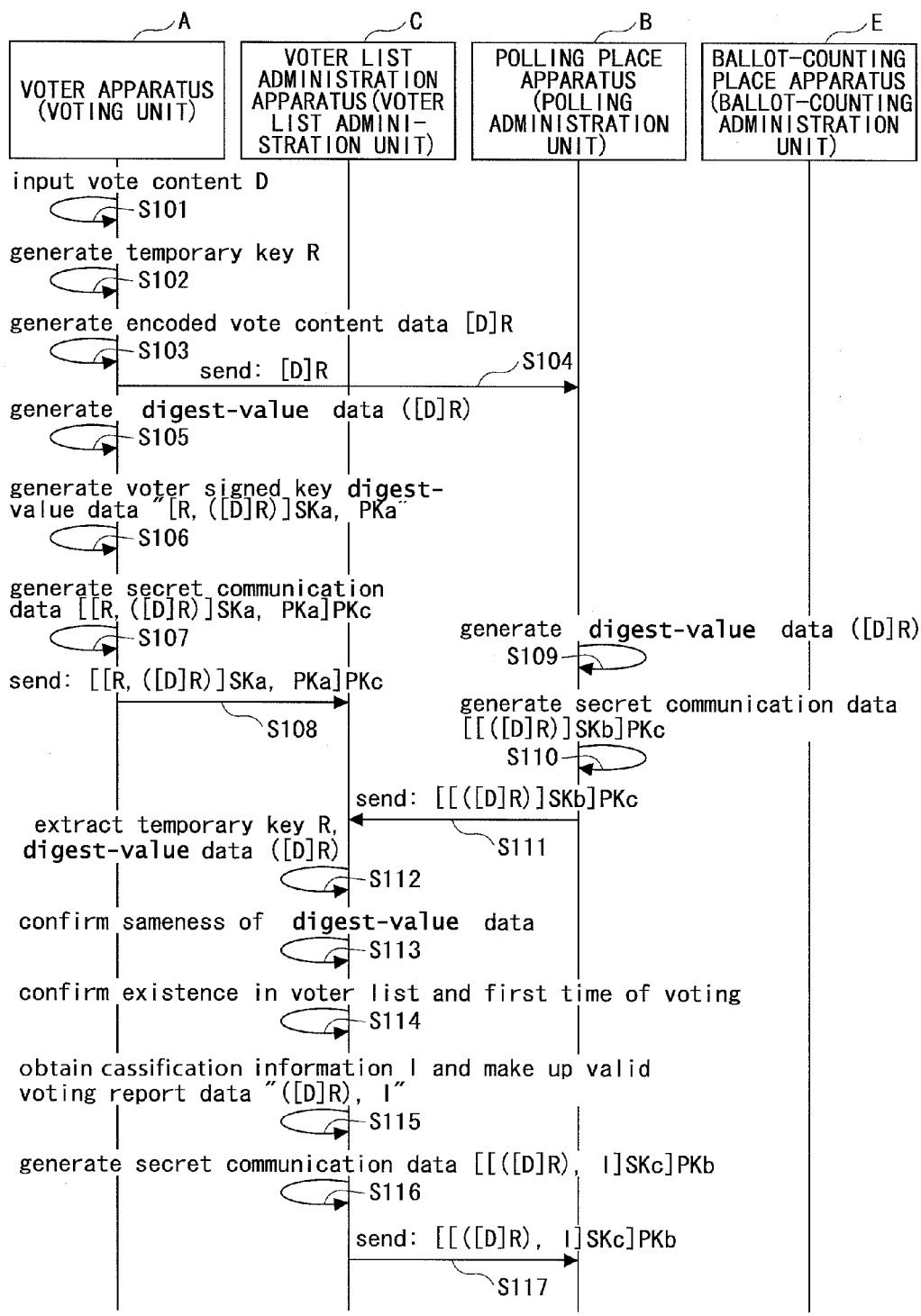
FIG. 3 is a sequence view (No. 1) showing an example of operations of the embodiment.
Figure 4:
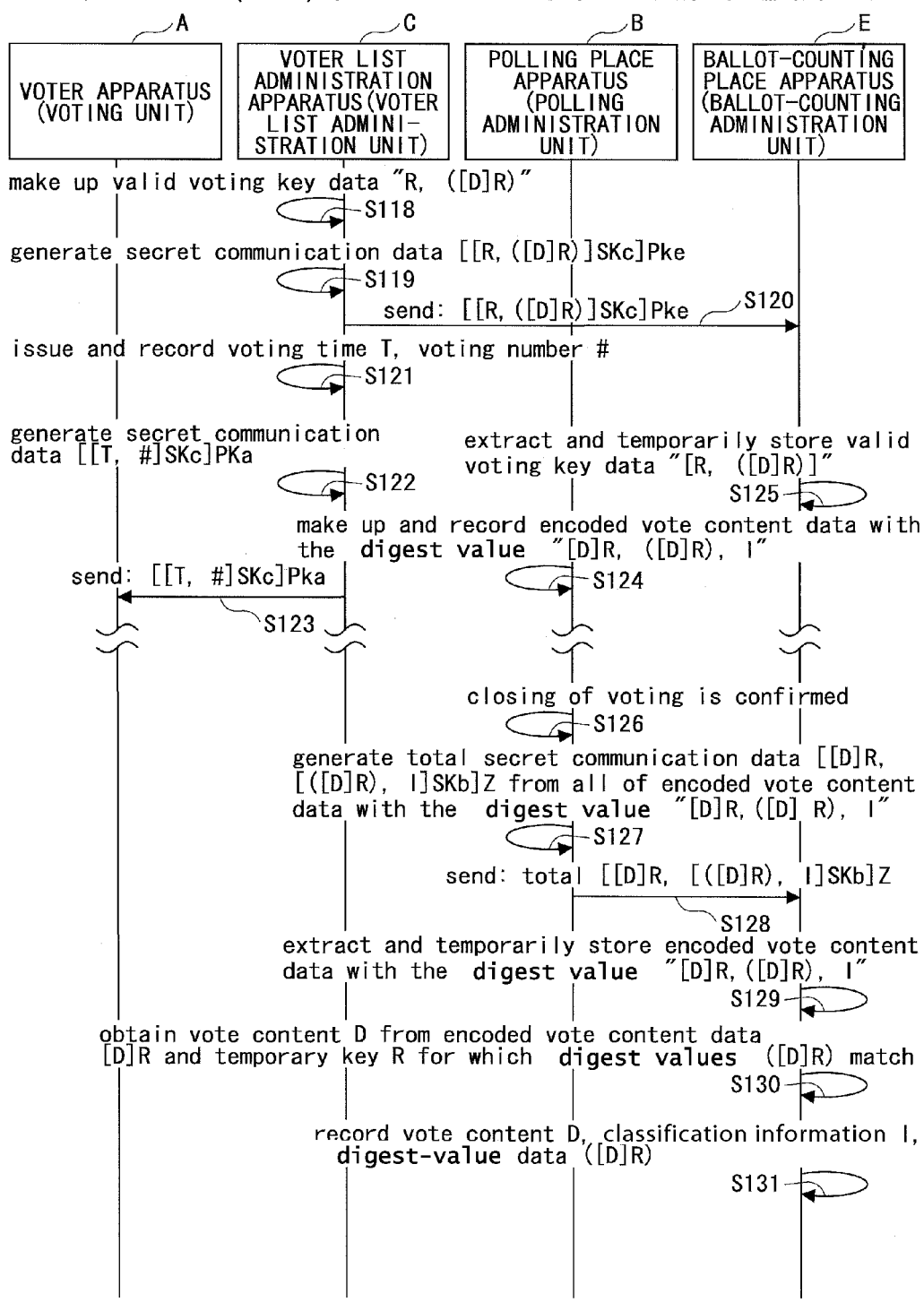
FIG. 4 is a sequence view (No. 2) showing an example of operations of the embodiment.

FIG. 3 and FIG. 4 are sequence views showing an example of operations of the embodiment.

In FIG. 3, when a voter operates the voter apparatus A to input vote-content data D (step S101), the voter apparatus A randomly generates a temporary key R (step S102), generates encoded vote-content data "[D]R" (step S103), and sends the encoded vote-content data "[D]R" from the voter apparatus A to the polling place apparatus B (step S104).

Then, the voter apparatus A generates digest-value data "([D]R)", which is a digest value of the encoded vote content data "[D]R", from the encoded vote content data "[D]R" in accordance with the predetermined digest-value-generation expression (step S105).

Then, the voter apparatus A applies an electronic signature on the previously generated temporary key R and the digest-value data "([D]R)" by a secret key SKa of the voter, adds a public key PKa, and generates voter signed key-digest-value data "[R, ([D]R)]SKa, [PKa]Kc" (step S106). The reason why the public key PKa is included in the voter signed key-digest-value data here is for performing a high-speed confirmation of the signature at the receiving side and when the public key can be specified by other methods, the public key PKa may not be included. Further, other voter identification data capable of identifying a voter may be used instead of the electronic signature by the secret key SKa of the voter.

Then, the voter apparatus A applies a public key PKc of the voter list administration apparatus C, which is the receiver, on the voter signed key-digest-value data "[R, ([D]R)]SKa, [PKa]Kc" to generate secret communication data "[[R, ([D]R)]SKa, PKa]PKc" (step S107), and sends it from the voter apparatus A to the voter list administration apparatus C (step S108). Here, under an environment where the voter apparatus A and the voter list administration apparatus C can have secured communication, for example they are connected via a private line or the like, the voter signed key-digest-value data "[R, ([D]R)]SKa, [PKa]Kc" may be sent as is. Further, instead of encoding with the public key, other secret communication methods may be used.

The polling place apparatus B, that receives the encoded vote-content data "[D]R" from the voter apparatus A, generates digest-value data "([D]R)" from the encoded vote-content data "[D]R" in accordance with the predetermined for generating the digest-value-generation expression (step S109), generates secret communication data "[R[([D]R)]SKb]PKc" by applying a secret key SKb, which is a signature of the polling place apparatus B itself, and a public key PKc of the voter list administration apparatus C, which will be a receiver (step S110), and sends it from the polling place apparatus B to the voter list administration apparatus C (step S111). Here, under an environment where the polling place apparatus B and the voter list administration apparatus C can have secured communication and in which the opposite sides of the communication can be confirmed, for example, where they are provided in a single apparatus, connected via a private line even when separately provided in different apparatuses or the like, the digest-value data "([D]R)" may be sent as is. Further, instead of encoding with the secret key and the public key, other secret communication methods may be used.

The voter list administration apparatus C, after receiving data from the voter apparatus A and the polling place apparatus B, extracts values included in both of the data (step S112). The voter list administration apparatus C decodes the secret communication data "[[R, ([D]R)]SKa, PKa]PKc" received from the voter apparatus A by applying its secret key SKc to obtain data "[R, ([D]R)]SKa, [PKa]Kc", and further decodes it by applying the public key PKa of the voter apparatus A to obtain the temporary key R and the digest-value data "([D]R)". The voter list administration apparatus C also decodes the secret communication data "[[([D]R)]SKb]PKc" received from the polling place apparatus B by applying its secret key SKc to obtain data "[([D]R)]SKb", and further decodes it by applying the public key PKb of the polling place apparatus B to obtain the digest-value data "([D]R)".

The voter list administration apparatus C then compares the digest-value data "([D]R)" obtained from the data via the voter apparatus A and the digest-value data "([D]R)" obtained from the data via the polling place apparatus B to detect identicalness (step S113).

The voter list administration apparatus C refers to voter list data based on the voter identification data such as the decoded public key PKa or the like of the data for which identicalness is confirmed, and confirms whether the voter identification data exists in the voter list, as well as whether it is a first time of voting (step S114). Whether it is the first time of voting may be determined by recording votes in connection with the voter list data, and determining that it is the first time of voting for a new vote that is not recorded as already voted. Alternatively, the voter identification data for the voter for whom the determination is done, may be recorded separately from the voter list data, and is indicative that it is the first time of voting when a public key of a new voter is not included in the separated record.

When it is confirmed that the voter identification data exists in the voter list and it is the first time of voting, the voter list administration apparatus C obtains classification information I such as sex, age, assigned region or the like from the voter list data, creates valid voting report data including digest-value data "([D]R), I" including the classification information I as content (step S115), applies the secret key SKc, which is the signature of the voter list administration apparatus C, and the public key PKb of the polling place apparatus B, which will be the receiver, to generate secret communication data "[[([D]R), I]SKc]PKb" (step S116), and sends it from the voter list administration apparatus C to the polling place apparatus B (step S117). Here, under an environment where the voter list administration apparatus C and the polling place apparatus B can have secure communication and in which the opposite sides of the communication can be confirmed, for example, where they are provided in a single apparatus, connected via a private line even when separately provided in different apparatuses or the like, the valid voting report data "([D]R)" may be sent as is. Further, instead of encoding with the secret key and the public key, other secret communication methods may be used.

Subsequently, as shown in FIG. 4, the voter list administration apparatus C makes up valid voting key data "R, ([D]R)" based on the previously obtained data (step S118), applies the secret key SKc, which is the signature of the voter list administration apparatus C, and the public key PKe of the ballot-counting place apparatus E, which will be the receiver, to generate secret communication data "[[R,([D]R)]SKc]PKe" (step S119), and sends it from the voter list administration apparatus C to the ballot-counting place apparatus E (step S120). Here, under an environment where the voter list administration apparatus C and the ballot-counting place apparatus E can have secured communication and in which the opposite sides of the communication can be confirmed, for example, where they are provided in a single apparatus, connected via a private line even when separately provided in different apparatuses or the like, the valid voting key data "R, ([D]R)" may be sent as is. Further, instead of encoding with the secret key and the public key, other secret communication methods may be used.

Subsequently, the voter list administration apparatus C issues a time stamp T based on a current time (controlled by the operating system of the computer composing the voter list administration apparatus C) and a new voting number # based on the proximate voting number #, which is the accumulated voting number, and records them with the temporary key R and the digest-value data "([D]R)" associated with each other (step S121). These records are not associated with the voter list data.

Then, the voter list administration apparatus C applies the secret key SKc, which is the signature of the voter list administration apparatus C, and the public key PKa of the voter apparatus A (voter), which will be the receiver, on the time stamp T and the voting number # to generate secret communication data "[[T, #]SKc]PKa" (step S122), and sends it from the voter list administration apparatus C to the voter apparatus A (step S123). Here, under an environment where the voter list administration apparatus C and the voter apparatus A can have secured communication, for example, where they are connected via a private line or the like, the time stamp T and the voting number # may be sent as is. Further, instead of encoding with the secret key and the public key, other secret communication methods may be used.

The polling place apparatus B makes up encoded vote-content data with the digest value "[D]R, ([D]R), I" based on the previously obtained data and records the encoded vote-content data [D]R (step S124). The polling place apparatus B temporarily stores the whole encoded vote-content data with the digest value "[D]R, ([D]R), I" for future operations.

The ballot-counting place apparatus E extracts the temporary key R and the digest-value data "([D]R)" from the secret communication data "[[R, ([D]R)]SKc]PKe" received from the voter list administration apparatus C and temporarily stores them (step S125). It means that the ballot-counting place apparatus E decodes the secret communication data "[[R, ([D]R)]SKc]PKe" by applying its secret key SKe, then further decodes the decoded data by applying the public key PKc of the voter list administration apparatus C to obtain the valid voting key data "R,([D]R)", and then records it.

The above operations are repeatedly performed every time a vote is sent from different voter apparatuses A. When a vote is sent from the same voter apparatus A, it is determined as not being the first time of voting with confirmation by the voter list data (step S114), and treated as an invalid vote so that no further operations are performed.

Subsequently, when the polling place apparatus B confirms a close of voting at a predetermined time or by an indication from an operator (step S126), the polling place apparatus B generates secret communication data "[[D]R, [([D]R), I]SKb]Z" by applying the secret key SKb, which is the signature of the polling place apparatus B, and the symmetric cryptographic key Z, which was previously set between the polling place apparatus B and the ballot-counting place apparatus E, on the temporarily stored encoded vote-content data with the digest value "[D]R,([D]R), I" corresponding to all of the votes (step S127), and sends it from the polling place apparatus B to the ballot-counting place apparatus E (step S128). Here, under an environment where the polling place apparatus B and the ballot-counting place apparatus E can have secured communication and in which the opposite sides of the communication can be confirmed, for example, where they are provided in a single apparatus, connected via a private line even when separately provided in different apparatuses or the like, the encoded vote-content data with the digest value "[D]R, ([D]R), I" may be sent as is. Further, instead of encoding with the secret key and the public key, other secret communication methods may be used.

After receiving the secret communication data "[[D]R, [([D]R), I]SKb]Z" from the polling place apparatus B, the ballot-counting place apparatus E decodes the data by applying the symmetric cryptographic key Z to obtain "[D]R, [([D]R), I]SKb", further decodes it by applying the public key PKc of the voter list administration apparatus C to obtain the encoded vote-content data with the digest value "[D]R, ([D]R), I", and temporarily stores it (step S129).

Then, the ballot-counting place apparatus E compares the digest-value data "([D]R)" included in the temporarily stored valid voting key data "R,([D]R)", obtained via the voter list administration apparatus C, and the temporarily stored encoded vote-content data with the digest value "[D]R, ([D]R), I", obtained via the polling place apparatus B, and decodes the encoded vote-content data "[D]R" by the temporary key R for which the digest values match to obtain the vote contents D (step S130). Then, the ballot-counting place apparatus E records the decoded vote contents D, the classification information I, and the digest-value data "([D]R)" (step S131).

The ballot-counting place apparatus E finishes the operation of ballot-counting when the operations for all of the valid voting key data "R,([D]R)" and the encoded vote-content data with the digest value "[D]R,([D]R), I" are finished.

The temporarily stored data, other than data recorded for later verification, are deleted in the respective apparatuses.

Modified Examples

In the above embodiment, the polling place apparatus B sends the encoded vote-content data with the digest value "[D]R, ([D]R)" corresponding to all votes to the ballot-counting place apparatus E after the close of voting is confirmed (step S128 of FIG. 4). However, as for a case like a questionnaire where counting of votes promotes subsequent votes, the polling place apparatus B may successively send the encoded vote-content data with the digest value "[D]R,([D]R)" to the ballot-counting place apparatus E.

Further in the above embodiment, the voter list administration apparatus C sends the data including the classification information I such as sex, age, assigned region or the like to the ballot-counting place apparatus E via the polling place apparatus B (step S117 of FIG. 3 or step S128 of FIG. 4), the classification information I may be included in the data with the valid voting key data sent from the voter list administration apparatus C to the ballot-counting place apparatus E (step S120 of FIG. 4). With this, aggregation of the classification information can be possible without individually identifying the voters.

Further in the above embodiment, although only the operations of electronic voting are described, the operation of the embodiment may be performed with conventional handwritten voting. In such a case, voters perform the handwritten voting at physically settled polling places. The results of the handwritten voting are aggregated with the results of the electronic voting.

As a Whole

As described above, according to the present embodiment, the following merits can be obtained.

(1) Nobody can know the vote contents D until both the valid voting key data "R, ([D]R)", which are output from the voter list administration apparatus C every time a vote is performed, and the encoded vote-content data with the digest value "[D]R,([D]R)", which are output from the polling place apparatus B at a predetermined time such as the close of voting or the like are obtained, and after counting of votes starts, the vote contents D can only be obtained at the ballot-counting place apparatus E, therefore, the independence and safety of the counting place can be guaranteed.

(2) As the voter list administration apparatus C determines that a vote is valid when the voter is confirmed to be qualified by the voter list data (concretely, the voter is determined to be qualified when the voter exists in the voter list data, as well as the vote is the first time), the qualifications of voters can be guaranteed.

(3) As the vote contents D and the voters are not associated with each other when opening the votes at the ballot-counting place apparatus E and corresponding data for them do not exist at any other places, anonymity of voters and prevention of forced intervention can be guaranteed.

(4) As the vote contents D can be obtained later from the temporary key R, the time stamp T, the voting number #, and the digest-value data "([D]R)" recorded in the voter list administration apparatus C, and the encoded vote-content data "[D]R" and the predetermined digest-value-generation expression recorded in the polling place apparatus B, properly counting of all the finally opened results obtained can be confirmed.

(5) The voter can confirm that their vote is counted by receiving the voting number and the time stamp issued by the voter list administration apparatus C when it determines the vote is valid.

(6) Nobody can know the vote contents until the vote contents are opened and after the vote contents are opened, and as the voter obtains only the voting number and the time stamp, the voter cannot show evidence regarding for whom the voter voted even by forced intervention.

(7) As a whole, a highly practical electronic voting system can be provided that places emphasis on the conventional separated functions such as a voter list administration, a polling place, and a ballot-counting place, and capable of fulfilling conditions necessary for an electronic voting system.

As described above, according to the electronic voting system (input content data managing system) embodiment, the following process is performed.

(1) Encoded vote-content data (encoded content data) which is obtained by encoding vote-content data (content data) by a cryptographic key and correspondent data of the cryptographic key with digest-value data of the encoded vote-content data are separately stored.

(2) Then, at a predetermined time (when a predetermined condition is met), the encoded vote-content data and the cryptographic key are matched using digest-value data of the encoded vote-content data as a matching key to obtain a matched cryptographic key, the encoded vote-content data are decoded by the matched cryptographic key and the vote-content data are obtained.

(3) Further, whether a vote is valid may be pre-determined prior to the predetermined time, by comparing digest-value data of the encoded vote-content data as a matching key. Although this process is similar to the above process (2), at this point in time, the encoded vote-content data and the cryptographic key are not yet matched so that the encoded vote-content data is not yet decoded by the cryptographic key.

Specifically, first, when a voting unit (voter apparatus A, an example of an input unit) receives vote-content data "D", the voter apparatus generates encoded vote-content data "[D]R" by encoding the vote-content data "D" with a cryptographic key (temporary key) "R", and generates digest-value data "([D]R)" of the encoded vote-content data "[D]R" capable of identifying sameness of the encoded vote-content data "[D]R" such as a digest value. The voting unit may randomly generate the cryptographic key "R".

Then, the encoded vote-content data "[D]R" is stored in a first electronic storing apparatus (polling place apparatus B). Further, the cryptographic key "R" is stored in a second electronic storing apparatus (voter list administration apparatus C) with the digest-value data "([D]R)" of the encoded vote-content data "[D]R" in corresponded with each other. Here, the first storing apparatus and the second storing apparatus are controlled separately from each other such that the first storing apparatus is controlled by the polling place apparatus B and the second storing apparatus is controlled by the voter list administration apparatus C.

Then, at a predetermined time, the encoded vote-content data "[D]R" stored in the first storing apparatus and the cryptographic key "R" stored in the second storing apparatus are matched using digest-value data "([D]R)" of the encoded vote-content data obtained from the encoded vote-content data "[D]R" stored in the first storing apparatus and the digest-value data "([D]R)" of the encoded vote-content data "[D]R" obtained via the second storing apparatus as a matching key to obtain the vote-content data "D" by decoding the encoded vote-content data "[D]R" by the matched cryptographic key "R".

As described above, "a predetermined time" may be when voting is closed, when indication from an operator is input, or the like.

Further, whether a vote is valid may be pre-determined prior to the predetermined time, by comparing digest-value data "([D]R)" of the encoded vote-content data obtained from the encoded vote-content data "[D]R" stored in the first storing apparatus and the digest-value data "([D]R)" of the encoded vote-content data "[D]R" obtained via the second storing apparatus as a matching key. Although this process is similar to the above process (2), at this point in time, the encoded vote-content data "[D]R" and the cryptographic key "R" have not been matched so that the encoded vote-content data "[D]R" is not yet decoded by the cryptographic key "R".

Figure 5:
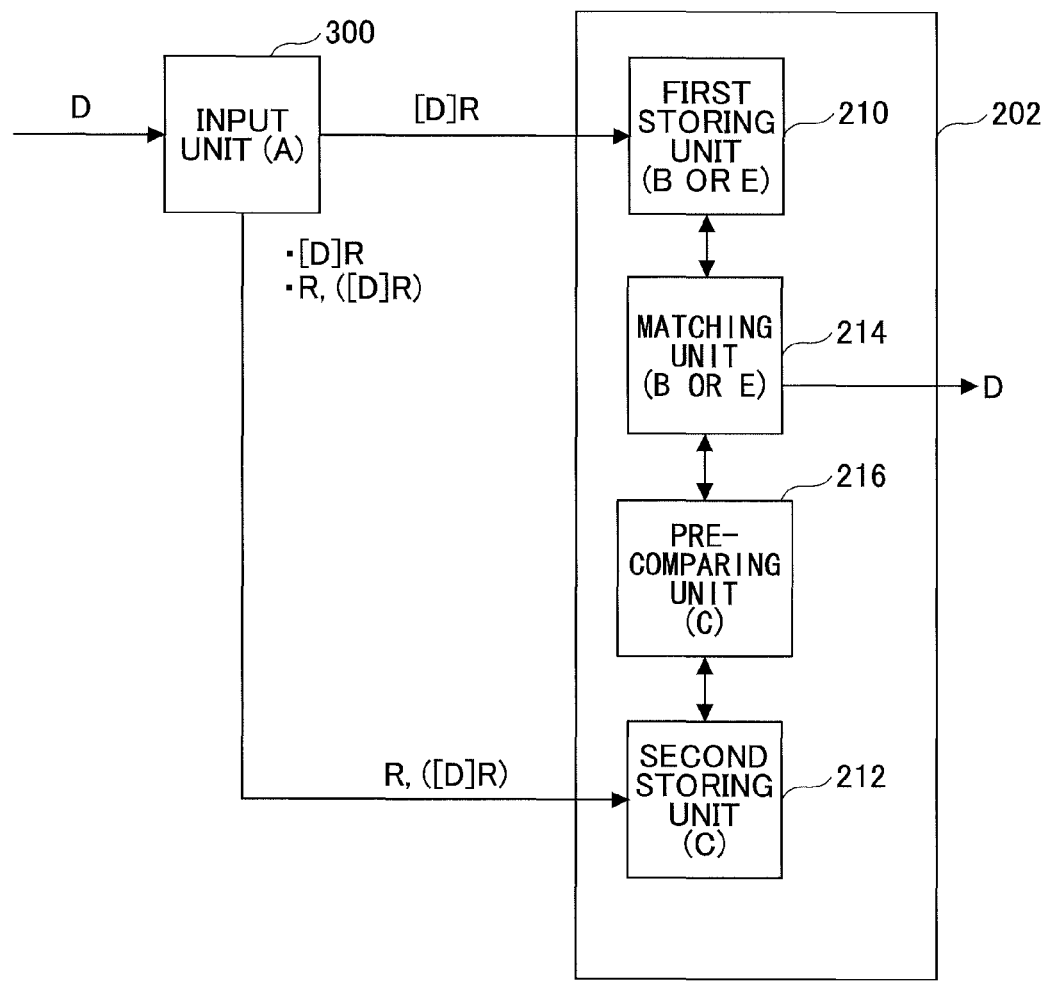
FIG. 5 is a block diagram showing an example of an electronic voting system of an embodiment.
Figure 6:
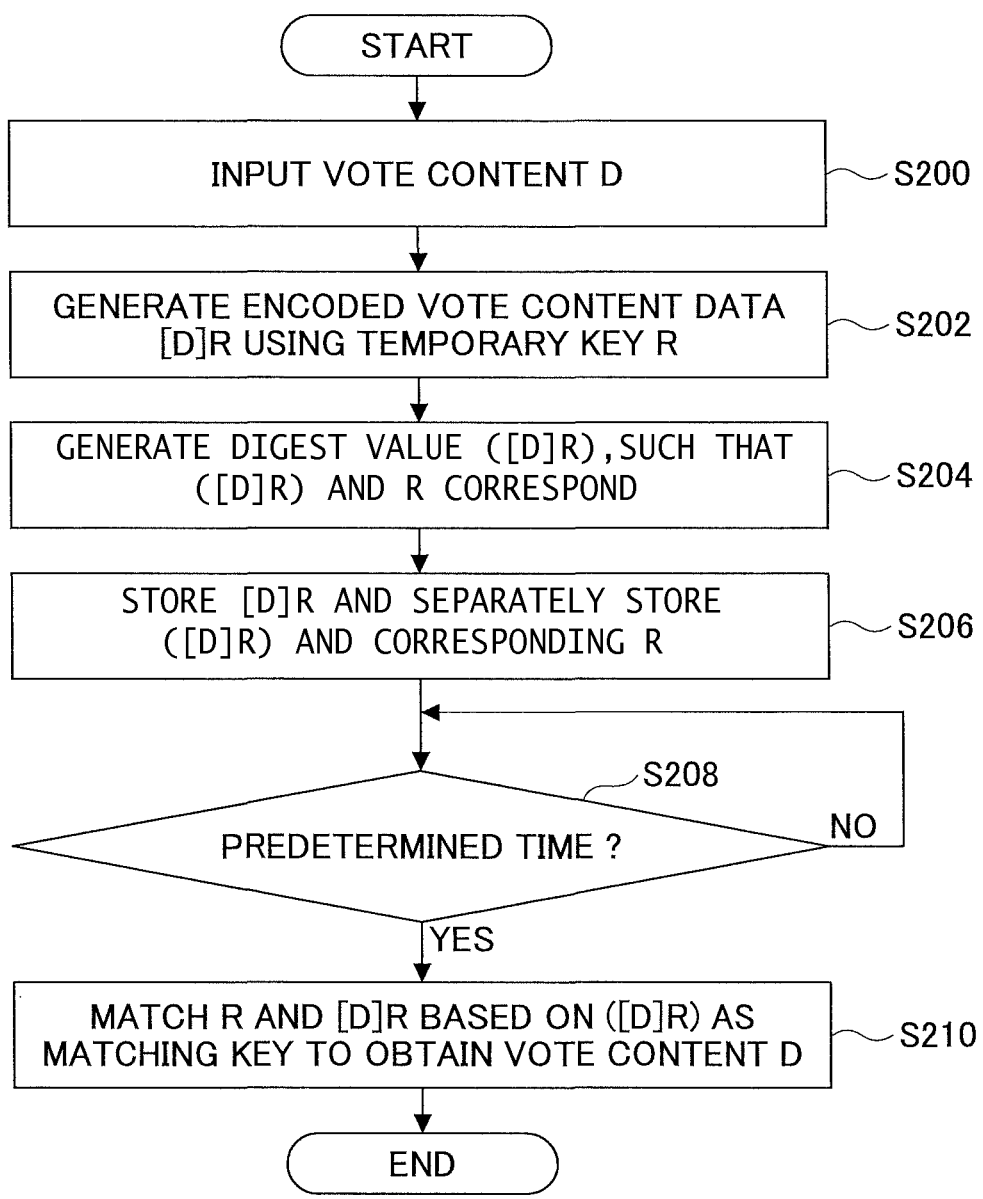
FIG. 6 is a flowchart showing an example of a method of electronically voting.

The above process is further explained with reference to drawings. FIG. 5 is a block diagram showing an example of the electronic voting system of the embodiment. FIG. 6 is a flowchart showing an example of a method of electronically voting.

The electronic voting system 200 includes an input unit 300 and an administration unit 202. The administration unit 202 includes a first electronic storing apparatus 210, a second electronic storing apparatus 212, a matching unit 214, and a pre-comparing unit 216.

With reference to the system shown in FIG. 1 as well, the input unit 300 may correspond to the voter apparatus A, the polling place apparatus B may correspond to the first storing apparatus 210, the voter list administration apparatus C may correspond to the second storing apparatus 212 and the pre-comparing unit 216 and the ballot-counting place apparatus E may correspond to the matching unit 214.

With reference to FIG. 5 and FIG. 6, operation of the electronic voting system 200 is explained. In the following an example where the cryptographic key is a temporary key "R" is explained.

When the input unit 300 receives vote-content data "D" (S200, corresponding to S101 in FIG. 3), the input unit 300 generates encoded vote-content data "[D]R" by encoding the vote-content data "D" with a temporary key "R" (S202, corresponding to S103 in FIG. 3). The input unit 300 may be configured to randomly generate the temporary key "R", or the input unit 300 may obtain the temporary key "R" from some other unit, which is included in the administration unit 202 for example, although not shown in the drawings.

Then, the input unit 300 generates digest-value data "([D]R)" of the encoded vote-content data "[D]R" capable of identifying sameness of the encoded vote-content data "[D]R" and corresponds the digest-value data "([D]R)" with the temporary key "R" (S204, corresponding to S105 and S106 in FIG. 3). As explained above, the digest-value data may by a digest value which is obtained by converting original data by a hash computing operation or the like.

Then, the encoded vote-content data "[D]R" and corresponding digest-value data "([D]R)" with the temporary key "R" are separately stored in the first storing apparatus 210 and the second storing apparatus 212, respectively (S206, corresponding to S104 and S108 in FIG. 3). Here, the first storing apparatus 210 and the second storing apparatus 212 may be composed of physically different respective apparatuses or may be composed of respective components constructed by software in a single apparatus. However, the first storing apparatus 210 and the second storing apparatus 212 are separately controlled. It means that the second storing apparatus 212 is controlled not to be accessed by the matching unit 214, or the data stored in the second storing apparatus 212 is not sent to the matching unit 214 until the predetermined time. In this embodiment, the second storing apparatus 212 is controlled by the pre-comparing unit 216 so that the matching unit 214 cannot access the second storing apparatus 212. However, the pre-comparing unit 216 is configured not to be able to access the first storing apparatus 210.

Then, at the predetermined time (YES in S208, corresponding to S128 or the like in FIG. 4), the matching unit 214 matches the encoded vote-content data "[D]R" stored in the first storing apparatus 210 and the temporary key "R" stored in the second storing apparatus 212 using digest-value data "([D]R)" of the encoded vote-content data "[D]R" obtained from the encoded vote-content data "[D]R" stored in the first storing apparatus 210 and the digest-value data "([D]R)" of the encoded vote-content data "[D]R" stored in the second storing apparatus 212 as a matching key to obtain the vote-content data "D" by decoding the encoded vote-content data "[D]R" by the matched temporary key "R" (S210, corresponding to S129 and S130 in FIG. 4).

Here, as described above, the digest-value data "([D]R)" may by a digest value which is obtained by converting original data by a hash computing operation or the like. Thus, by using a common hash computing operation, digest-value data "([D]R)" of the encoded vote-content data "[D]R" can be obtained from the encoded vote-content data "[D]R".

Although not shown in FIG. 6, between steps S206 and S208, whether a vote is valid may be pre-determined by the pre-comparing unit 216 (corresponding to S113). At this point in time, the matching unit 214 has a function of the polling place apparatus B as well and generates digest-value data "([D]R)" of the encoded vote-content data "[D]R" obtained from the encoded vote-content data "[D]R" stored in the first storing apparatus 210. Then, the matching unit 214 sends the generated digest-value data "([D]R)" to the pre-comparing unit 216. Then, the pre-comparing unit 216 determines whether a vote is valid by comparing the digest-value data "([D]R)" obtained from the matching unit 214 and the digest-value data "([D]R)" of the encoded vote-content data "[D]R" obtained via the second storing apparatus 212 as a matching key.

Alternatively, whether a vote is valid may be previously determined by the matching unit 214 instead of the pre-comparing unit 216. In this case, the pre-comparing unit 216 may only send the digest-value data "([D]R)", without the temporary key "R", to the matching unit 214 before the predetermined time. Then, the matching unit 214 may determine whether a vote is valid by comparing the digest-value data "([D]R)" obtained from the encoded vote-content data "[D]R" stored in the first storing apparatus 210 and the digest-value data "([D]R)" obtained from the pre-comparing unit 216 as a matching key.

As for a case shown in FIG. 3 and FIG. 4, the encoded vote-content data "[D]R" is sent to the polling place apparatus B in step S104 in FIG. 3 and stored in the polling place apparatus B. Thus, the first storing apparatus 210 corresponds to the polling place apparatus B. In this case, the digest-value data "([D]R)" of the encoded vote-content data "[D]R" obtained from the encoded vote-content data "[D]R" stored in the first storing apparatus 210 is generated by the polling place apparatus B in step S109 in FIG. 3 and sent to the ballot-counting place apparatus E with the encoded vote-content data "[D]R" in step S128 in FIG. 4.

Alternatively, only the encoded vote-content data "[D]R" may be sent to the ballot-counting place apparatus E in step S128 in FIG. 4. In this case, the ballot-counting place apparatus E may generate the digest-value data "([D]R)" of the encoded vote-content data "[D]R" by performing the common hash computing operation on the encoded vote-content data "[D]R".

Figure 9:
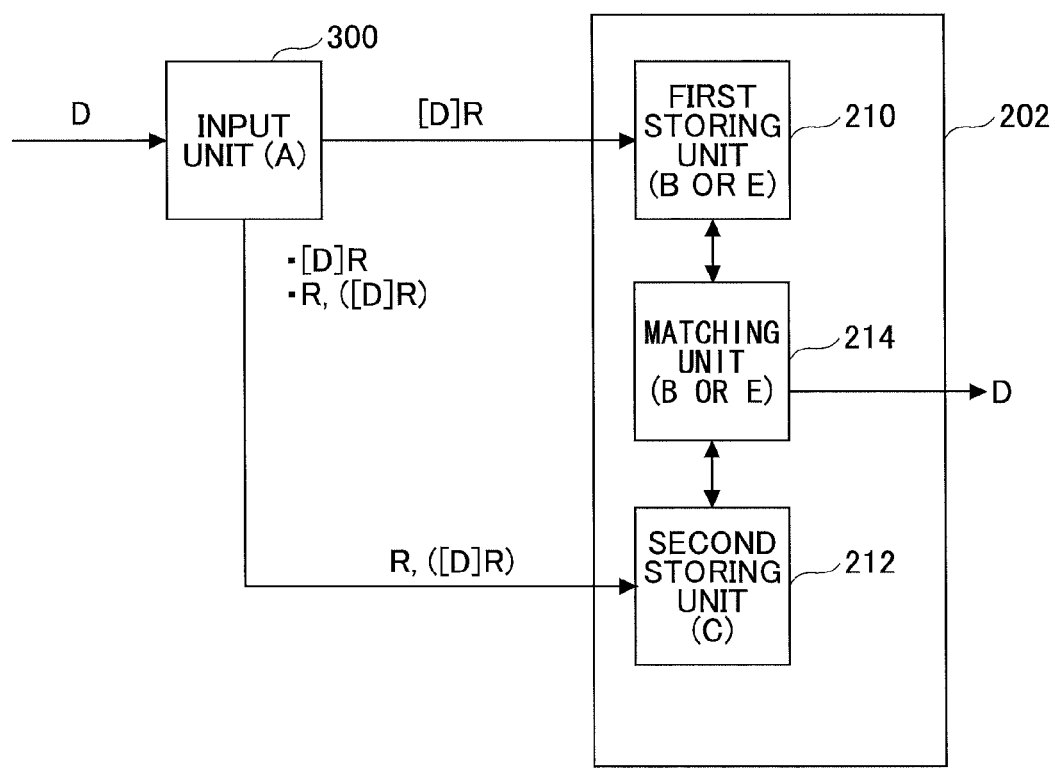
FIG. 9 is a block diagram showing another example of an electronic voting system of an embodiment.

FIG. 9 is a block diagram showing another example of the electronic voting system of the embodiment. In FIG. 9, the electronic voting system 200 does not include the pre-comparing unit 216. For a case where a vote's validity is not previously determined, the pre-comparing unit 216 is not necessary.

Alternative Embodiments

Further, alternative embodiments will be explained in the following with reference to drawings.

Second Embodiment

Figure 7:
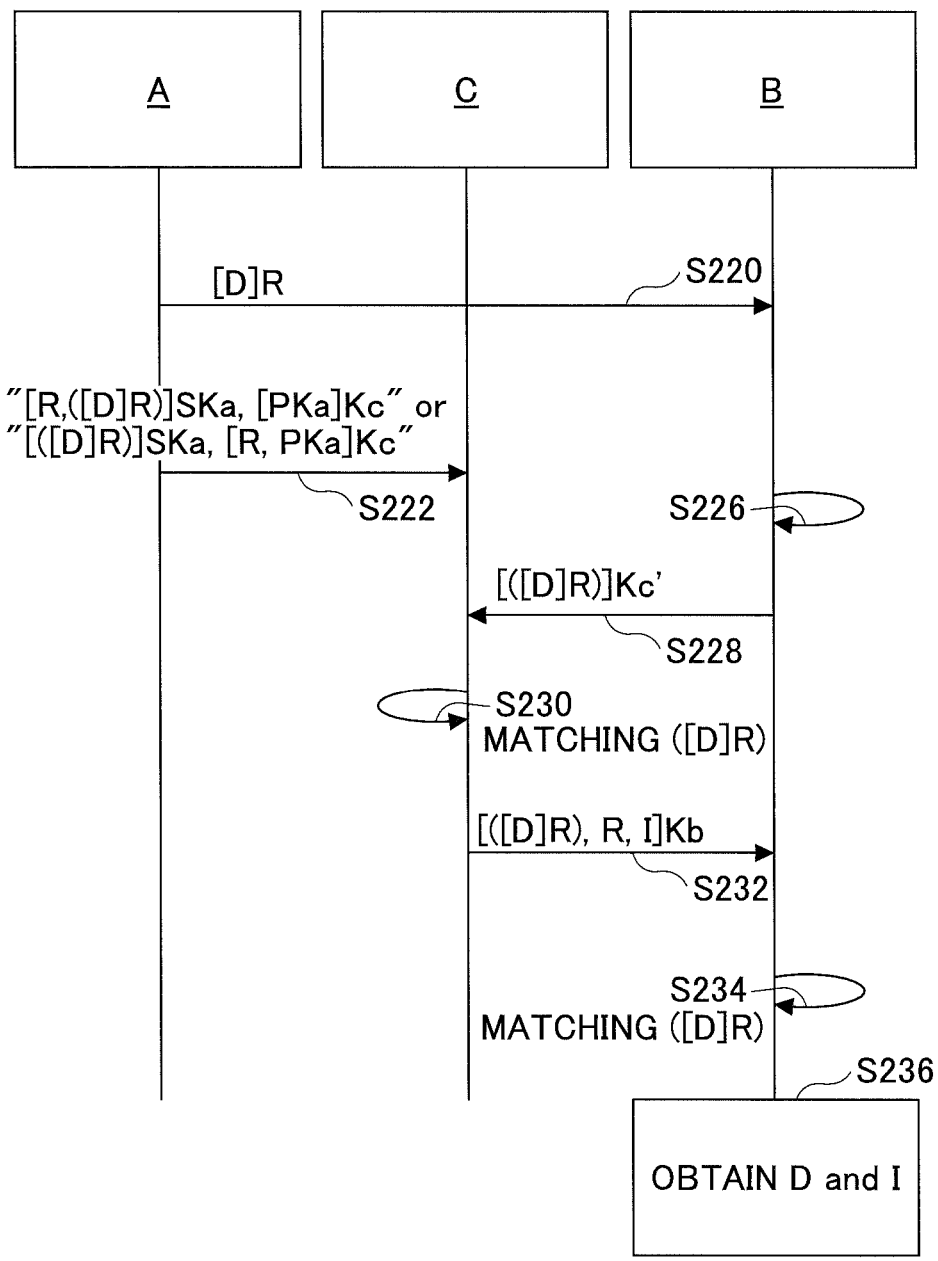
FIG. 7 is a flowchart showing an example of a method of electronically voting by an electronic voting system of an embodiment.

FIG. 7 is a flowchart showing an example of a method of electronically voting by the electronic voting system of the second embodiment.

In this embodiment, the structure of the voting system is similar to that of the first embodiment and the system includes the voter apparatus A, the polling place apparatus B and the voter list administration apparatus C. In this embodiment, the polling place apparatus B has a function of the ballot-counting place apparatus E as well.

In this embodiment, the voter apparatus A, the polling place apparatus B and the voter list administration apparatus C are controlled to be confidential from each other. The polling place apparatus B and the voter list administration apparatus C may be provided in the same apparatus or as different apparatuses.

The operations of the second embodiment are similar to the operations of the first embodiment shown in FIG. 3 and FIG. 4.

Similar to step S101 to step S102, when the vote content "D" is input to the voter apparatus A, the voter apparatus A generates the encoded vote-content data "[D]R" using the temporary key R. Then, the encoded vote-content data "[D]R" is stored in the polling place apparatus B (S220).

Further, the voter apparatus A generates digest-value data "([D]R)", which is a digest value of the encoded vote-content data "[D]R", from the encoded vote-content data "[D]R" in accordance with the predetermined digest-value-generation expression. The voter apparatus A applies an electronic signature on the previously generated temporary key "R" and the digest-value data "([D]R)" by a secret key SKa of the voter, adds a public key PKa, and generates voter signed key-digest-value data "[R, ([D]R)]SKa, [PKa]Kc". Here, Kc is a key of the voter list administration apparatus C and may be a common key between the voter apparatus A and the voter list administration apparatus C or a public key PKc of the voter list administration apparatus C.

Alternatively, the electronic signature may be applied only on the digest-value data "([D]R)" and the temporary key "R" may be encoded by the key Kc of the voter list administration apparatus C. In this case, the voter signed key-digest-value data is expressed as "[([D]R)]SKa, [R, PKa]Kc". The voter signed key-digest-value data "[R, ([D]R)]SKa, [PKa]Kc" or "[([D]R)]SKa, [R, PKa]Kc" is stored in the voter list administration apparatus C (S222).

Alternatively, generation of the digest-value data "([D]R)", the digest-value data "([D]R)", or the voter signed key-digest-value data "[R, ([D]R)]SKa, [PKa]Kc" or "[([D]R)]SKa, [R, PKa]Kc" may be performed in an apparatus different from the voter apparatus A, which is capable of being communicate with the voter apparatus A in a secret manner by a network or the like. This apparatus may be provided in the same apparatus that includes the polling place apparatus B or the voter list administration apparatus C, or may be separately provided from the apparatus that includes the polling place apparatus B or the voter list administration apparatus C.

Then, the polling place apparatus B generates digest-value data "([D]R)" of the encoded vote-content data "[D]R" from the encoded vote-content data "[D]R" stored in the polling place apparatus B in accordance with the predetermined computing expression for generating the digest value.

Then, the polling place apparatus B encodes the digest-value data "([D]R)" by a key Kc' of the voter list administration apparatus C (S226) and sends the encoded digest-value data [([D]R)]Kc' to the voter list administration apparatus C (S228). Here, similar to the key Kc of the voter list administration apparatus C, the voter list administration apparatus C may be a common key between the polling place apparatus B and the voter list administration apparatus C or the public key PKc of the voter list administration apparatus C.

Subsequently, the voter list administration apparatus C compares the digest-value data "([D]R)" obtained from the data via the voter apparatus A and the digest-value data "([D]R)" obtained from the data via the polling place apparatus B to determine their sameness (S230). At this point in time, the voter list administration apparatus C confirms the validity of the voting by referring to the voter list data based on the voter identification data such as the decoded public key PKa or the like similarly to step S114 in FIG. 3. When the validity of the voting is confirmed, the information indicating the validity of the voting is recorded in association with the voter identification data (such as the PKa, or the voter signed key-digest-value data "[R, ([D]R)]SKa, [PKa]Kc" or "[([D]R)]SKa, [R, PKa]Kc") so that the fact that the voter's vote is determined as effective can be recorded and can be confirmed later. Thus, voters can verify that their votes are being counted accordingly by confirming the record. However, in this embodiment, as the voter identification data is only corresponded with the digest-value data or the temporary key, not with the encoded vote-content data, the contents of the encoded vote-content data as to, for example, who voted for whom, remains confidential.

Then, at a predetermined time, for example when the effectiveness of the voting is confirmed or the like, the temporally key "R" associated with the digest-value data "([D]R)" and with the classification information I which are encoded by a key Kb of the polling place apparatus B "[([D]R), R, I]Kb" is sent to the polling place apparatus B (S232). Here, the key Kb of the polling place apparatus B may be a common key between the voter list administration apparatus C and the key Kb of the polling place apparatus B or a public key PKb of the polling place apparatus B. The classification information I is attribution information that cannot specify an individual, for example sex, region, age, assigned region, a weighted value based on the attribution information or the like.

Then, the polling place apparatus B matches the encoded vote-content data "[D]R" stored in the polling place apparatus B and the temporary key "R" sent from the voter list administration apparatus C using, as a matching key, digest-value data "([D]R)" of the encoded vote-content data "[D]R" generated in step S226 to match with the digest-value data "([D]R)" of the encoded vote-content data "[D]R" sent from the voter list administration apparatus C in step S232, and obtains the vote-content data "D" by decoding the encoded vote-content data "[D]R" by the matched temporary key "R" (S236).

Further, the polling place apparatus B can calculate the total amount of the voting by counting the vote-content data "[D]R". At this point in time, the voting may be calculated while applying the weighted value obtained from the classification information I.

Third Embodiment

Figure 8:
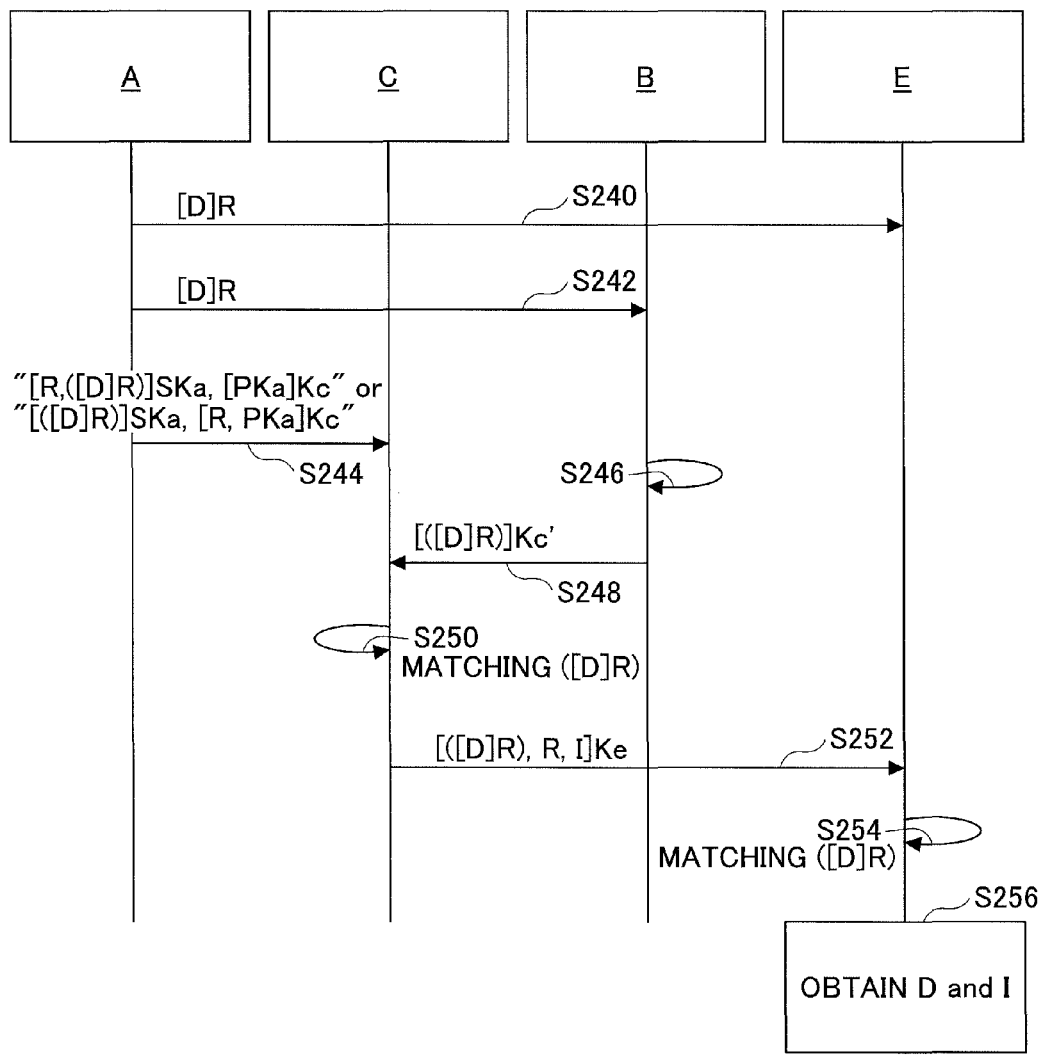
FIG. 8 is a flowchart showing an example of a method of electronically voting by an electronic voting system of an embodiment.

FIG. 8 is a flowchart showing an example of a method of electronically voting by the electronic voting system of a third embodiment.

In this embodiment, the structure of the voting system is similar to that of the first embodiment and the system includes the voter apparatus A, the polling place apparatus B, the voter list administration apparatus C and the ballot-counting place apparatus E.

In this embodiment, the voter apparatus A, the polling place apparatus B, the voter list administration apparatus C and the ballot-counting place apparatus E are controlled to be confidential from each other. The polling place apparatus B, the voter list administration apparatus C and the ballot-counting place apparatus E may be provided in the same apparatus or as different apparatuses.

The operations of the third embodiment are similar to the operations of the first embodiment shown in FIG. 3 and FIG. 4.

Similar to step S101 to step S102, when the vote content "D" is input to the voter apparatus A, the voter apparatus A generates the encoded vote-content data "[D]R" using the temporary key R. Then, the encoded vote-content data "[D]R" is stored in the ballot-counting place apparatus E (S240) and in the polling place apparatus B (S242).

Further, similar to step S222 shown in FIG. 7 of the second embodiment, the voter apparatus A generates the digest-value data "([D]R)" of the encoded vote-content data "[D]R", and voter signed key-digest-value data "[R, ([D]R)]SKa, [PKa]Kc" or "[([D]R)]SKa, [R, PKa]Kc". Then, the voter signed key-digest-value data "[R, ([D]R)]SKa, [PKa]Kc" or "[([D]R)]SKa, [R, PKa]Kc" is stored in the voter list administration apparatus C (S244).

Then, the polling place apparatus B generates digest-value data "([D]R)" of the encoded vote-content data "[D]R" and the encoded digest-value data [([D]R)]Kc' (S246). Subsequently, the polling place apparatus B sends the encoded digest-value data [([D]R)]Kc' to the voter list administration apparatus C (S248).

Subsequently, the voter list administration apparatus C compares the digest-value data "([D]R)" obtained from the data via the voter apparatus A and the digest-value data "([D]R)" obtained from the data via the polling place apparatus B to determine their sameness (S250). At this point in time, the voter list administration apparatus C confirms the effectiveness of the voting by referring to the voter list data based on the voter identification data such as the decoded public key PKa or the like similarly to step S114 in FIG. 3.

Then, at a predetermined time, for example when the effectiveness of the voting is confirmed or the like, the temporally key "R" in correspondence with the digest-value data "([D]R)" and with the classification information I which are encoded by a key Ke of the ballot-counting place apparatus E "[([D]R), R, I]Ke" is sent to the ballot-counting place apparatus E (S252). Here, the key Ke of the ballot-counting place apparatus E may be a common key between the voter list administration apparatus C and the ballot-counting place apparatus E or a public key PKe of the ballot-counting place apparatus E.

Then, the ballot-counting place apparatus E matches the encoded vote-content data "[D]R" stored in the ballot-counting place apparatus E and the temporary key "R" sent from the voter list administration apparatus C using digest-value data "([D]R)" of the encoded vote-content data "[D]R" generated from that which is stored in the ballot-counting place apparatus E in step S240 and the digest-value data "([D]R)" of the encoded vote-content data "[D]R" sent from the voter list administration apparatus C in step S252 as a matching key to obtain the vote-content data "D" by decoding the encoded vote-content data "[D]R" by the matched temporary key "R" (S256).

Further, the ballot-counting place apparatus E can calculate the total amount of the voting by counting the vote-content data "[D]R". At this point in time, the voting may be calculated while applying the weighted value obtained from the classification information I.

The individual constituents of the electronic voting system 200 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

Although in the above embodiment, an electronic voting system is exemplified as an input content data managing system, the embodiment may be adaptable for input content data for which the content is to be kept secret or the like until a predetermined time, such as until the effectiveness of the input content data is confirmed or the like.

As described above, the present invention is described with preferred embodiments thereof. Although the present invention is described with specific examples, the present invention is not limited to the specifically disclosed embodiments, and variations and modifications may be made without departing from the scope of the present invention. The present invention is not limited to the embodiments illustrated for explanatory purposes.

Further, the following embodiments are included.

According to one embodiment, there is provided an electronic voting system including a voting unit, a voter list administration unit, a polling administration unit and a ballot-counting administration unit establishing secure communications with each other, wherein the polling administration unit, upon receiving from the voting unit encoded vote-content data encoded by a temporary key, generates a digest value capable of detecting identicalness of the encoded vote-content data and sends the digest value to the voter list administration unit, the voter list administration unit receives the temporary key, the digest value of the encoded vote-content data, and voter identification data for identifying a voter from the voting unit, and determines that a vote is valid when the digest value received from the voting unit and the digest value received from the polling administration unit match, and a voter identified by the voter identification data is qualified by voter list data, in order to send the digest value of the encoded vote-content data as a valid voting report to the polling administration unit and to further send the temporary key and the digest value to the ballot-counting administration unit, the polling administration unit sends the encoded vote-content data and the digest value of the encoded vote-content data to the ballot-counting administration unit at a predetermined time, and the ballot-counting administration unit decodes the encoded vote-content data by the temporary key, for the temporary key and the encoded vote-content data the digest values of which match among received data from the voter list administration unit and the polling administration unit, to obtain vote-content data.

According to another embodiment, in the electronic voting system, when the voter list administration unit determines that the vote is valid, the voter list administration unit may obtain classification information of the voter, and may send the classification information with the digest value in correspondence with each other to the ballot-counting administration unit.

According to another embodiment, in the electronic voting system, the voter identification data may be an electronic signature by a secret key of a voter.

According to another embodiment, in the electronic voting system, the voter list administration unit may determine that the vote is valid when the voter identified by the voter identification data exists in the voter list data as well as when the vote is the first time.

According to another embodiment, in the electronic voting system, the voter list administration unit may issue a time indicating when the vote is performed and an accumulated voting number and return those to the voting unit when the vote is determined to be valid.

According to another embodiment, in the electronic voting system, the voter list administration unit may record the temporary key, and a time indicating when the vote is performed and an accumulated voting number which are issued when the vote is determined to be valid with the digest value associated with each other, and the polling administration unit may record the encoded vote-content data and a computing expression for generating the digest value.

Further, in the input content data managing system, the matching unit may include a polling administration unit that generates the digest-value data of the encoded content data stored in the first storing apparatus before the predetermined time, and a ballot-counting administration unit that generates the digest-value data of the encoded content data stored in the first storing apparatus, and matches the encoded content data stored in the first storing apparatus and the cryptographic key sent via the pre-comparing unit using the digest-value data of the encoded content data obtained from the encoded content data stored in the first storing apparatus and the digest-value data of the encoded content data sent via the pre-comparing unit as a matching key at the predetermined time to obtain the content data by decoding the encoded content data by the matched cryptographic key.

The pre-comparing unit may determine whether a vote is valid by comparing the digest value stored in the second storing apparatus and the digest value received from the polling administration unit.

Further, the input content data managing system may further include an input unit that, upon receiving the content data, generates the encoded content data by encoding the content data with the cryptographic key, and generates the digest-value data of the encoded content data.

Further, the method of managing input content data, before storing the encoded content data in the first storing apparatus, and storing the cryptographic key with the digest-value data in the second storing apparatus, further include, upon receiving content data, generating the encoded content data by encoding the content data with the cryptographic key; and generating the digest-value data of the encoded vote-content data.

The present invention is not limited to the specifically disclosed embodiments, and variations and modifications may be made without departing from the scope of the present invention.

What is claimed is:

1. An input content data managing system, comprising:
a first electronic storing apparatus that stores original encoded content data generated by encoding original content data using a cryptographic key;
a second electronic storing apparatus that stores the cryptographic key with digest-value data of the original encoded content data and with user identification data for identifying a user who inputs the original content data,
the second storing apparatus being controlled separately from the first storing apparatus, the digest-value data having been previously generated from the original encoded content data using a predetermined digest-value-generation-expression,
the digest-value data being capable of identifying sameness of newly obtained encoded content data to the original encoded content data by generating new digest-value data from the newly obtained encoded content data using the predetermined digest-value-generation-expression, and comparing the previously generated digest-value data with the new digest-value data; and
a matching unit that matches the first-storing-apparatus-stored encoded content data and the second-storing-apparatus-stored cryptographic key to determine a matched cryptographic key by using the predetermined digest-value-generation-expression to generate new digest data of the first-storing-apparatus-stored encoded content data, and matching the new digest-value data to the second-storing-apparatus-stored digest-value data to determine the matched second-storing-apparatus-stored cryptographic key, the matched second-storing-apparatus-stored cryptographic key usable to decode the first-storing-apparatus-stored encoded content data to obtain the content data,
wherein the system is operative to determine whether a user identified by the user identification data is qualified according to user list data and, when the user identified by the user identification data is determined to be qualified, to send the second-storing-apparatus-stored digest-value data and the corresponding second-storing-apparatus-stored cryptographic key to the matching unit.

2. The input content data managing system according to claim 1,
wherein the matching unit, before matching the first-storing-apparatus-stored encoded content data and the second-storing-apparatus-stored cryptographic key:
obtains the first-storing-apparatus-stored encoded content data, and
generates new digest-value data of the obtained first-storing-apparatus-stored encoded content data from the obtained first-storing-apparatus-stored encoded content data using the predetermined digest-value-generation-expression,
wherein the input content data managing system further comprises:
a pre-comparing unit operative to:
obtain the second-storing-apparatus-stored digest-value data,
compare the second-storing-apparatus-stored digest-value data and the new digest-value data generated by the matching unit and obtained from the matching unit, and
when the second-storing-apparatus-stored digest-value data matches the new digest-value data obtained from the matching unit, send the second-storing-apparatus-stored digest-value data and the corresponding second-storing-apparatus-stored cryptographic key to the matching unit, and
wherein the matching unit matches the first-storing-apparatus-stored encoded content data and the second-storing-unit-stored cryptographic key sent from the pre-comparing unit to determine the matched second-storing-apparatus-stored cryptographic key.

3. The input content data managing system according to claim 2,
wherein the determining whether the determining of whether user identified by the user identification data is qualified is carried out by the pre-comparing unit, the pre-comparing unit being further operative when the user identified by the user identification data is determined to be qualified and the second-storing-apparatus-stored reference value data matches the new reference value data obtained from the matching unit, carry out the sending of the second-storing-apparatus-stored digest-value data and the corresponding second-storing-apparatus-stored cryptographic key to the matching unit.

4. The input content data managing system according to claim 2, wherein when the second-storing-apparatus-stored digest-value data matches the new digest-value data obtained from the matching unit, the pre-comparing unit obtains attribution information that cannot specify an individual of the user from user list data, and associates the attribution information with the cryptographic key and the digest-value data of the encoded content data.

5. A method of managing input content data, comprising:
storing original encoded content data generated by encoding original content data using a cryptographic key in a first electronic storing apparatus;
storing the cryptographic key with digest-value data of the original encoded content data previously generated from the encoded content data using a predetermined digest-value-generation-expression, and with user identification data for identifying a user who inputs the original content data, the digest-value data being capable of identifying sameness of the original encoded content data by generating new digest-value data using the predetermined digest-value-generation-expression, and comparing the previously generated digest-value data with the new digest-value data, the storing in a second electronic storing apparatus controlled separately from the first storing apparatus;
determining whether a user identified by the user identification data is qualified according to user list data,
when the user identified by the user identification data is determined to be qualified, sending the second-storingapparatus-stored digest-value data and the corresponding second-storing-apparatus-stored cryptographic key to a matching unit; and the matching unit, upon receiving the second-storing-apparatus-stored digest-value data and the corresponding second-storing-apparatus-stored cryptographic key, matching the first-storing-apparatus-stored encoded content data and the second-storing-apparatus-stored cryptographic key to determine a matched cryptographic key by using the predetermined digest-value-generation-expression to generate new digest-value data of the first-storing-apparatus-stored encoded content data, and matching the new digest-value data to the second-storing-apparatus-stored digest-value data to determine the matched second-storing-apparatus-stored cryptographic key, the matched second-storing-apparatus-stored cryptographic key being usable to decode the first-storing-apparatus-stored encoded content data to obtain the content data.

6. The method of managing input content data according to claim 5, further comprising:

obtaining the first-storing-apparatus-stored encoded content data;

generating new digest-value data of the obtained first-storing-apparatus-stored encoded content data from the obtained first-storing-apparatus-stored encoded content data using the predetermined digest-value-generation-expression;

comparing the second-storing-apparatus-stored digest-value data and the new digest-value data, the obtaining, generating, and comparing occurring before the matching the first-storing-apparatus-stored encoded content data and the second-storing-apparatus-stored cryptographic key, and setting the second-storing-apparatus-stored digest-value data and the corresponding second-storing-apparatus-stored cryptographic key to be matched with the first-storing-apparatus-stored encoded content data when the second-storing-apparatus-stored digest-value data matches the new digest-value data obtained from the matching unit, wherein in the matching the first-storing-apparatus-stored encoded content data and the second-storing-apparatus-stored cryptographic key, only the second-storing-apparatus-stored cryptographic key is set to be matched with the first-storing-apparatus-stored encoded content data in the setting is matched with the first-storing-apparatus-stored encoded content data.

7. The input content data managing system according to claim 1, wherein the predetermined digest-value-generation-expression includes a hash computing operation.

8. The input content data managing system according to claim 1, wherein the matching unit is separate from the first storing apparatus and the second storing apparatus, and when operating, carries out a process comprising:

obtaining the first-storing-apparatus-stored encoded content data from the first storing apparatus, generating the new digest-value data of the first-storing-apparatus-stored encoded content data from the obtained first-storing-apparatus-stored encoded content data using the predetermined digest-value-generation-expression, obtaining the second-storing-apparatus-stored cryptographic key and the digest-value data from the second-storing-apparatus, and matching the first-storing-apparatus-stored encoded content data and the second-storing-apparatus-stored cryptographic key using the new digest-value data and the second-storing-apparatus-stored digest-value data obtained with the cryptographic key from the second storing apparatus.

9. The method of managing input content data according to claim 5, wherein the predetermined digest-value-generation-expression includes a hash computing operation.

10. The method of managing input content data according to claim 5, wherein the matching occurs in a matching unit that is separate from the first storing apparatus and the second storing apparatus, and includes:

obtaining the first-storing-apparatus-stored encoded content data from the first storing apparatus, generating the new digest-value data of the first-storing-apparatus-stored encoded content data from the obtained first-storing-apparatus-stored encoded content data using the predetermined digest-value-generation-expression, obtaining the second-storing-apparatus-stored cryptographic key and the digest-value data from the second storing apparatus, and matching the first-storing-apparatus-stored encoded content data and the second-storing-apparatus-stored cryptographic key using the new digest-value data and the obtained second-storing-apparatus-stored digest-value data.

* * * * *